US009889505B2

United States Patent
Aso (10) Patent No.: US 9,889,505 B2
(45) Date of Patent: Feb. 13, 2018

(54) MOUNTING DEVICE FOR CUTTING TOOL, TOOL BODY AND CUTTING TOOL

(71) Applicant: TUNGALOY CORPORATION, Iwaki-shi, Fukushima (JP)

(72) Inventor: Takahiro Aso, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 205 days.

(21) Appl. No.: 14/767,118

(22) PCT Filed: Sep. 5, 2014

(86) PCT No.: PCT/JP2014/073455
§ 371 (c)(1),
(2) Date: Aug. 11, 2015

(87) PCT Pub. No.: WO2015/034037
PCT Pub. Date: Mar. 12, 2015

(65) Prior Publication Data
US 2015/0367422 A1    Dec. 24, 2015

(30) Foreign Application Priority Data
Sep. 6, 2013   (JP) ................................. 2013-184554

(51) Int. Cl.
*B23C 5/00* (2006.01)
*B23B 27/16* (2006.01)
(Continued)

(52) U.S. Cl.
CPC .......... *B23B 27/1662* (2013.01); *B23C 5/109* (2013.01); *B23C 5/2208* (2013.01);
(Continued)

(58) Field of Classification Search
CPC . B23C 2210/60; B23C 2240/40; B23C 45/00; B23C 5/2403; B23B 27/1662; B23B 2205/045; B23B 2205/04; B23B 2200/286
See application file for complete search history.

(56) References Cited

U.S. PATENT DOCUMENTS 3,284,874 A * 11/1966 Green ................. B23B 27/1662
407/104
3,740,807 A *  6/1973 Getts .................. B23B 27/1662
407/101
(Continued)

FOREIGN PATENT DOCUMENTS

JP  H07-164213    6/1995
JP  H09-300110 A  11/1997
(Continued)

OTHER PUBLICATIONS

Search Report dated Nov. 25, 2014 in PCT counterpart application (No. PCT/JP2014/073455).

*Primary Examiner* — Will Fridie, Jr.
(74) *Attorney, Agent, or Firm* — Studebaker & Brackett PC (57) ABSTRACT

A cutting insert mounting system adapted for a cutting tool in which, by using a tightening screw, a cutting insert is detachably mounted on an insert mounting seat. A central axis of a screw hole of the insert mounting seat is inclined with respect to a normal direction of a bottom wall surface of the insert mounting seat. When the cutting insert is placed on the insert mounting seat, on a virtual plane defined to expand the bottom wall surface, a central axis of the screw hole is shifted from the central axis of a through hole of the cutting insert to the side of one of two side wall surfaces of the insert mounting seat. On the virtual plane, an axis shift direction of the central axis of the screw hole and an (Continued)

inclination direction of the central axis of the screw hole are different.

13 Claims, 6 Drawing Sheets

(51) Int. Cl.
  *B23C 5/10* (2006.01)
  *B23C 5/22* (2006.01)
(52) U.S. Cl.
  CPC ... *B23B 2205/045* (2013.01); *B23C 2210/168* (2013.01); *Y10T 407/2276* (2015.01)

(56) References Cited

U.S. PATENT DOCUMENTS

| | | | | |
|---|---|---|---|---|
| 3,805,351 A | * | 4/1974 | Mayer | B23C 5/2208 407/104 |
| 3,902,232 A | * | 9/1975 | Hertel | B23B 27/08 407/104 |
| 4,016,634 A | * | 4/1977 | Barnes | B23B 27/1662 407/104 |
| 4,427,322 A | * | 1/1984 | Kroll | B23B 27/1662 407/105 |
| 4,869,624 A | * | 9/1989 | Viellet | B23B 27/1662 407/104 |
| 4,875,812 A | * | 10/1989 | Haque | B23B 27/065 407/104 |
| 8,708,617 B2 | * | 4/2014 | Choi | B23B 27/007 407/103 |
| 9,089,900 B2 | * | 7/2015 | Kountanya | B23B 27/141 |
| 2003/0031518 A1 | * | 2/2003 | Hellstrom | B23B 27/1662 407/102 |
| 2003/0031519 A1 | * | 2/2003 | Hecht | B23B 27/1662 407/105 |
| 2004/0223816 A1 | * | 11/2004 | Sheffler | B23C 5/109 407/34 |
| 2004/0234349 A1 | * | 11/2004 | Ueda | B23B 27/145 407/113 |
| 2009/0245953 A1 | * | 10/2009 | Kramer | B23C 5/06 407/113 |
| 2012/0082521 A1 | * | 4/2012 | Burtscher | B23B 27/1662 407/103 |
| 2013/0142579 A1 | * | 6/2013 | Saji | B23B 27/1622 407/77 |
| 2015/0151364 A1 | * | 6/2015 | Choi | B23B 27/1662 407/104 |

FOREIGN PATENT DOCUMENTS

| | | |
|---|---|---|
| JP | 2008-006538 | 1/2008 |
| JP | 2011-051039 A | 3/2011 |
| WO | WO 2013/027211 | 2/2013 |

\* cited by examiner

MOUNTING DEVICE FOR CUTTING TOOL, TOOL BODY AND CUTTING TOOL

RELATED APPLICATIONS

This is a 371 U.S. National Phase of International Patent Application No. PCT/JP2014/073455 filed Sep. 5, 2014, and published as WO 2015/034037A1 on Mar. 12, 2015, which claims priority to JP 2013-184554, filed Sep. 6, 2013. The contents of the aforementioned applications are incorporated by reference in their entirety.

TECHNICAL FIELD

The present invention relates to a mounting device for a cutting tool for detachably mounting a cutting insert, and to a tool body and a cutting tool.

BACKGROUND ART

There are various mounting devices for a cutting tool for mounting a cutting insert to a tool body by using a tightening screw. The mounting device exemplified here refers to a mounting structure having a screw hole with which a tightening screw inserted into a through hole of the cutting insert can be threadedly engaged with in an insert mounting seat of the tool body.

In PTL 1, for example, a cutting tool is disclosed that, in the insert mounting seat having a bottom wall surface and two side wall surfaces, the cutting insert is detachably fixed by screwing the tightening screw into a screw hole of the bottom wall surface through the through hole of the cutting insert. In a mounting device of this cutting tool, a central axis of the screw hole in the bottom wall surface of the insert mounting seat is inclined with respect to a normal direction of the bottom wall surface. If the central axis of the screw hole is inclined as described in PTL 1, by screwing the tightening screw into the screw hole in the bottom wall surface through the through hole of the cutting insert, the cutting insert can be pressed on the side wall surface side of the insert mounting seat.

On the other hand, in a mounting device for the cutting tool for fixing the cutting insert by using the tightening screw, such a mounting device is also known in which a screw hole is formed by shifting the central axis of the screw hole corresponding to the tightening screw in parallel with the side wall surface side of the insert mounting seat with respect to the central axis of the through hole of the cutting insert. When the central axis of the screw hole of the insert mounting seat is formed being shifted with respect to the central axis of the through hole of the cutting insert as above, the cutting insert can be pressed onto the side wall surface side of the insert mounting seat by tightening the tightening screw.

CITATION LIST

Patent Literature

PTL 1: Japanese Patent Laid-Open No. 2008-6538

SUMMARY OF INVENTION

Technical Problem

In the cutting tool to which the prior-art mounting device is applied in which the screw hole is formed with the central axis thereof being shifted in parallel with respect to the central axis of the screw hole of the cutting insert, a force to fracture the tightening screw is applied thereto by tightening the tightening screw into the screw hole of the insert mounting seat through the through hole of the cutting insert. Therefore, a life of the tightening screw is likely to become relatively short. On the other hand, as in the mounting device in PTL 1, inclining the central axis of the screw hole with respect to the normal direction of the bottom wall surface of the insert mounting seat has a certain effect of suppressing fracture of the tightening screw.

In recent years, there has been a greater demand for further stabilization of a tightened state of the cutting insert due to a rise in demand for cutting work of difficult-to-cut materials and high-speed cutting, for example. Specifically, there is a need for a mounting device which can improve tightening stability of the cutting insert when the tightening screw is tightened and prevent the life of the tightening screw from uselessly becoming short.

The present invention was made in view of the above circumstances and has an object to more stabilize the tightened state of the cutting insert in the insert mounting seat.

Solution to Problem

According to an aspect of the present invention, there is provided a mounting device adapted for a cutting tool in which, by screwing a tightening screw into a screw hole of an insert mounting seat of a tool body through a through hole of a cutting insert, the cutting insert is detachably mounted on the insert mounting seat, wherein the insert mounting seat has a bottom wall surface and at least two side wall surfaces extending so as to intersect the bottom wall surface;

the screw hole intersects the bottom wall surface;

a central axis of the screw hole is inclined with respect to a normal direction of the bottom wall surface;

when the cutting insert is placed on the insert mounting seat, on a first virtual plane defined so as to expand the bottom wall surface, a first passage point of the central axis of the screw hole is shifted to least either one side of the at least two side wall surfaces from a second passage point of a central axis of the through hole; and when a shift direction of the first passage point of the central axis of the screw hole from the second passage point of the central axis of the through hole on the first virtual plane is defined as an axis shift direction, and a direction of a virtual line obtained by projecting the central axis of the screw hole onto the first virtual plane is defined as an inclination direction, the axis shift direction and the inclination direction are different directions.

Preferably, when a second virtual plane is defined so as to include the central axis of the screw hole and so as to be substantially orthogonal to the bottom wall surface,
the central axis of the screw hole is inclined so as to form an insert internal acute angle with a portion of the bottom wall surface on a side of the at least two side wall surfaces on the second virtual plane.

Preferably, the inclination direction of the central axis of the screw hole on the first virtual plane is a direction from the first passage point to the side of the at least two side wall surfaces. The at least two side wall surfaces may include a first side wall surface as a main constraining surface and a second side wall surface as a sub constraining surface. It is preferable that the axis shift direction is directed to a side of the first side wall surface of the first and second side surface walls and that the inclination direction is closer to a side of the second side wall surface of the first and second side wall surfaces as compared with the axis shift direction. At an intersecting portion defined by an extension of each of the first side wall surface and the second side wall surface, a third virtual plane extending so as to be substantially orthogonal to the bottom wall surface can be defined between the first side wall surface and the second side wall surface so as to bisect an intersecting angle at the intersecting portion. Preferably, the inclination direction and the axis shift direction can be directed to a region on the first side wall surface side in the two regions bounded by the third virtual plane. In some embodiments, the inclination direction and the axis shift direction are both preferably directed so as to intersect the first side wall surface. On the first virtual plane, an angle of the axis shift direction to the third virtual plane is preferably within a range from not less than 20° to not more than 90°. Moreover, on the first virtual plane, an angular difference between the inclination direction and the axis shift direction is preferably within a range from not less than 1° to not more than 80°. For example, the cutting insert has a substantially triangular plate shape. In some embodiments including this case, an intersecting angle of an intersecting portion defined by the extension of each of the first side wall surface and the second side wall surface is an acute angle. Alternatively, the intersecting angle may be an obtuse angle or a right angle. Preferably, when the tightening screw is screwed into the screw hole through the through hole of the cutting insert, the tightening screw may be in contact with a surface defining the through hole on substantially the entire circumference.

The present invention is also present in a tool body to which the mounting device of the above-described aspect is applied. Moreover, the present invention is also present in a cutting tool to which the mounting device of the above-described aspect is applied.

According to the above-described aspect of the present invention, the axis shift direction and the inclination direction on the first virtual plane are different directions. Therefore, by screwing the tightening screw into the screw hole opened in the bottom wall surface of the insert mounting seat of the tool body through the through hole of the cutting insert, the cutting insert can be pressed toward the desired side wall surface portion of the insert mounting seat in accordance with the axis shift direction. Moreover, by tightening the tightening screw, the cutting insert can be pressed toward another desired side wall surface portion in accordance with the inclination direction. Thus, according to the aspect of the present invention, a special effect can be provided that the cutting insert can be more firmly fixed on the insert mounting seat, and the tightened state of the cutting insert in the insert mounting seat can be further stabilized.

DESCRIPTION OF EMBODIMENTS

An embodiment of the present invention will be described by referring to the drawings.

Figure 1:
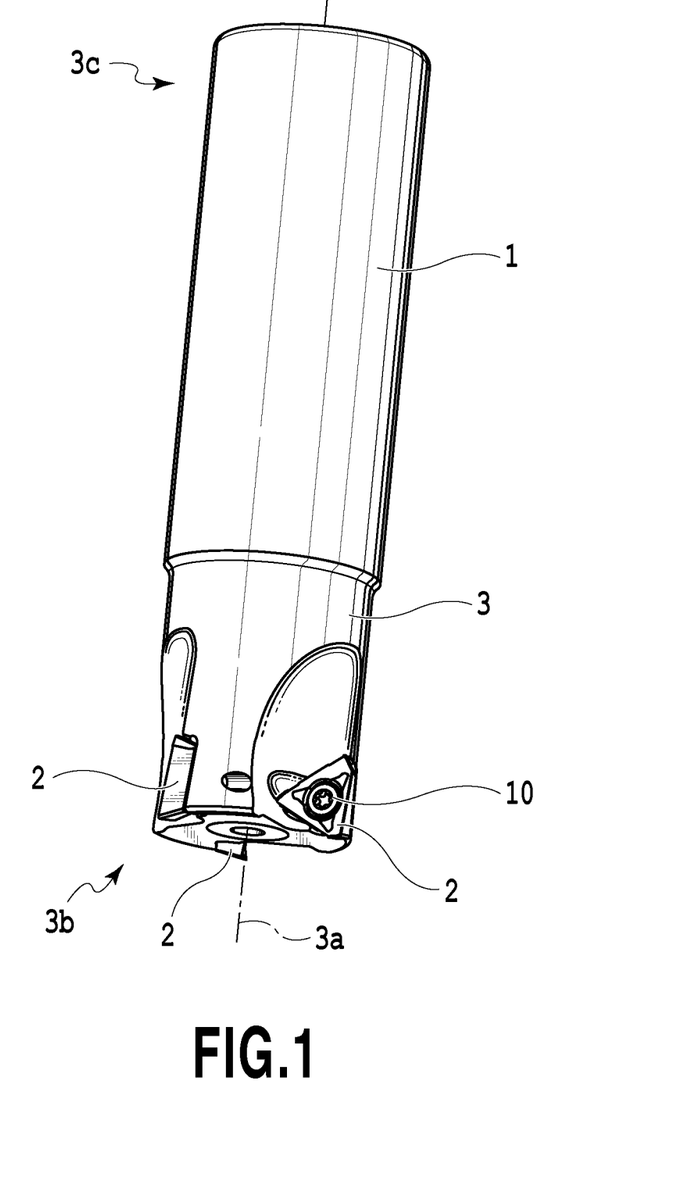
FIG. 1 is a perspective view of a cutting tool in an embodiment of the present invention.
Figure 2:
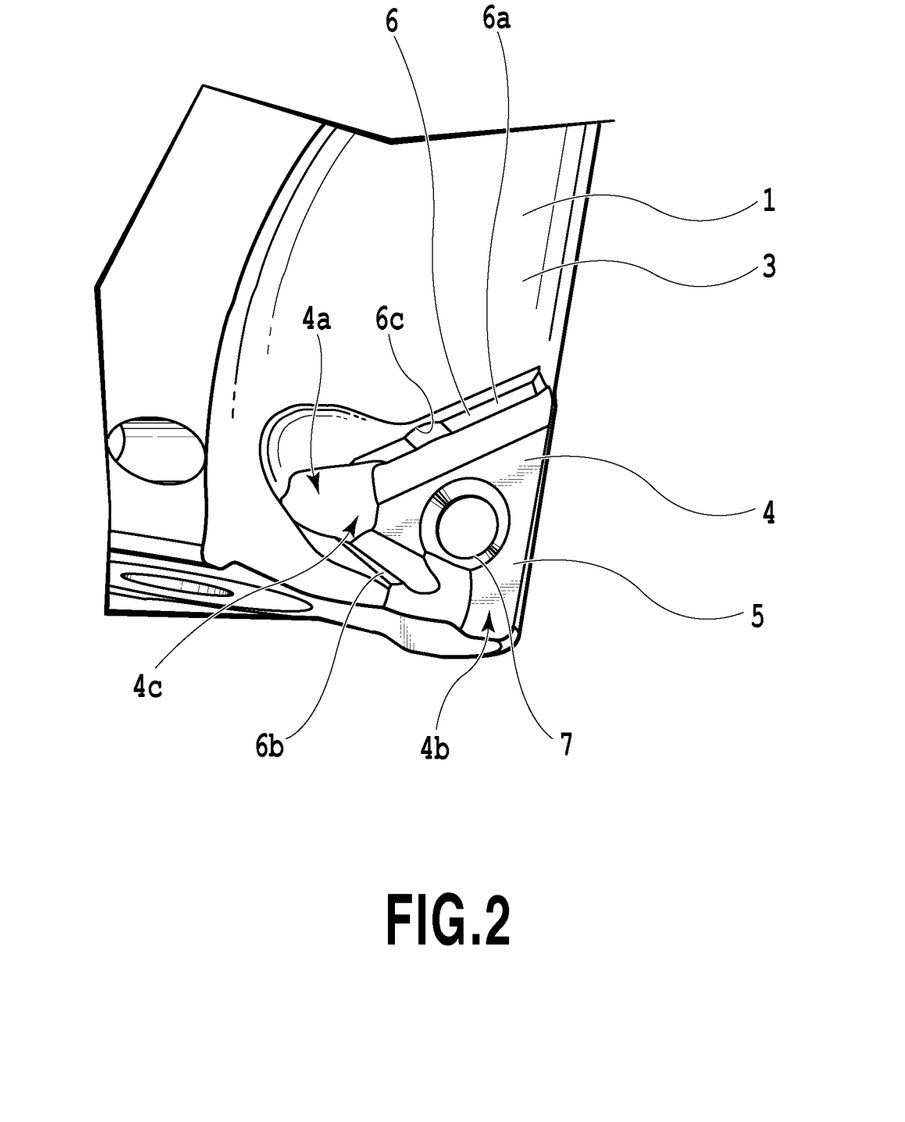
FIG. 2 is an enlarged perspective view of an insert mounting seat and its periphery of a tool body from which a cutting insert and a fixing screw are removed in the cutting tool in FIG. 1.
Figure 3:
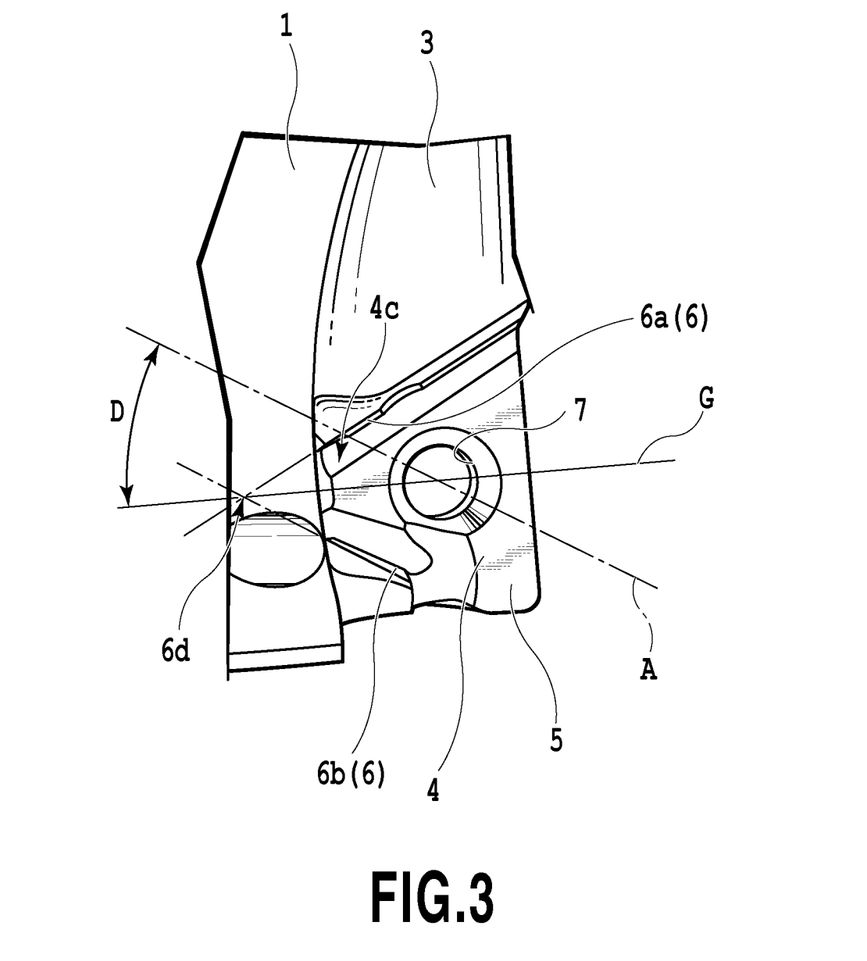
FIG. 3 is an enlarged view of a part of the tool body when the insert mounting seat in FIG. 2 is seen from a direction opposite to a bottom wall surface.
Figure 4:
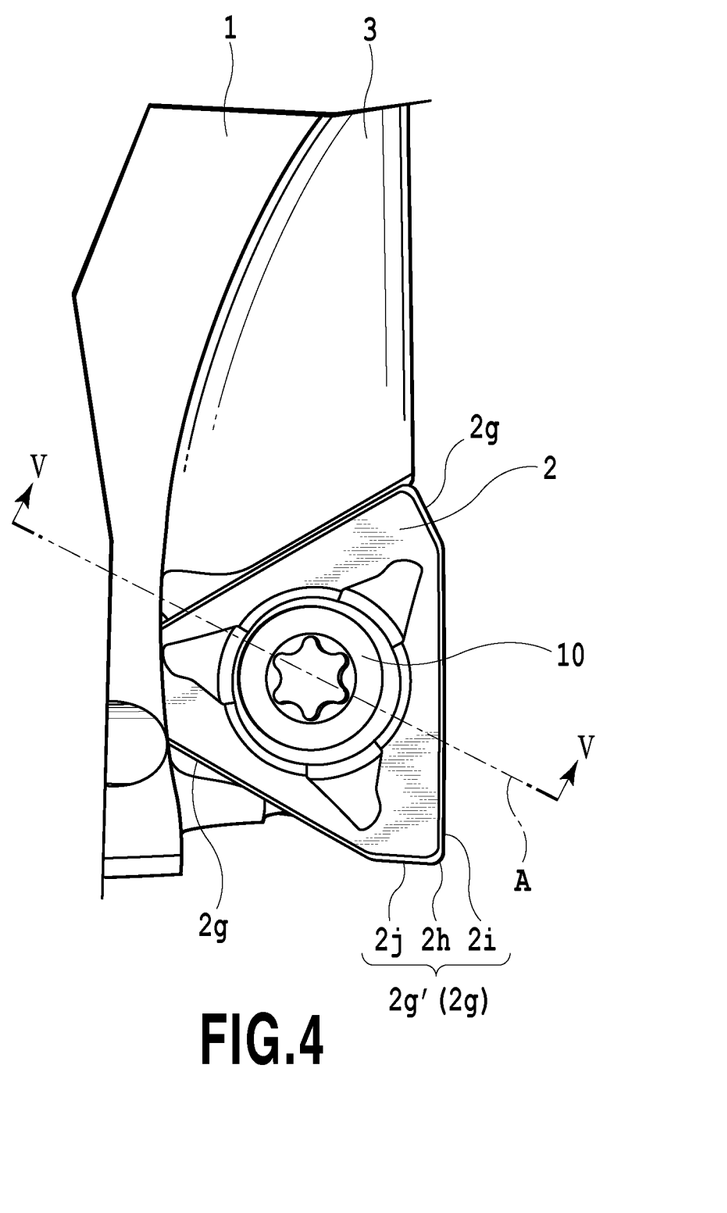
FIG. 4 is an enlarged view of a part of the cutting tool in FIG. 1 seen from the same direction as in FIG. 3.
Figure 5:
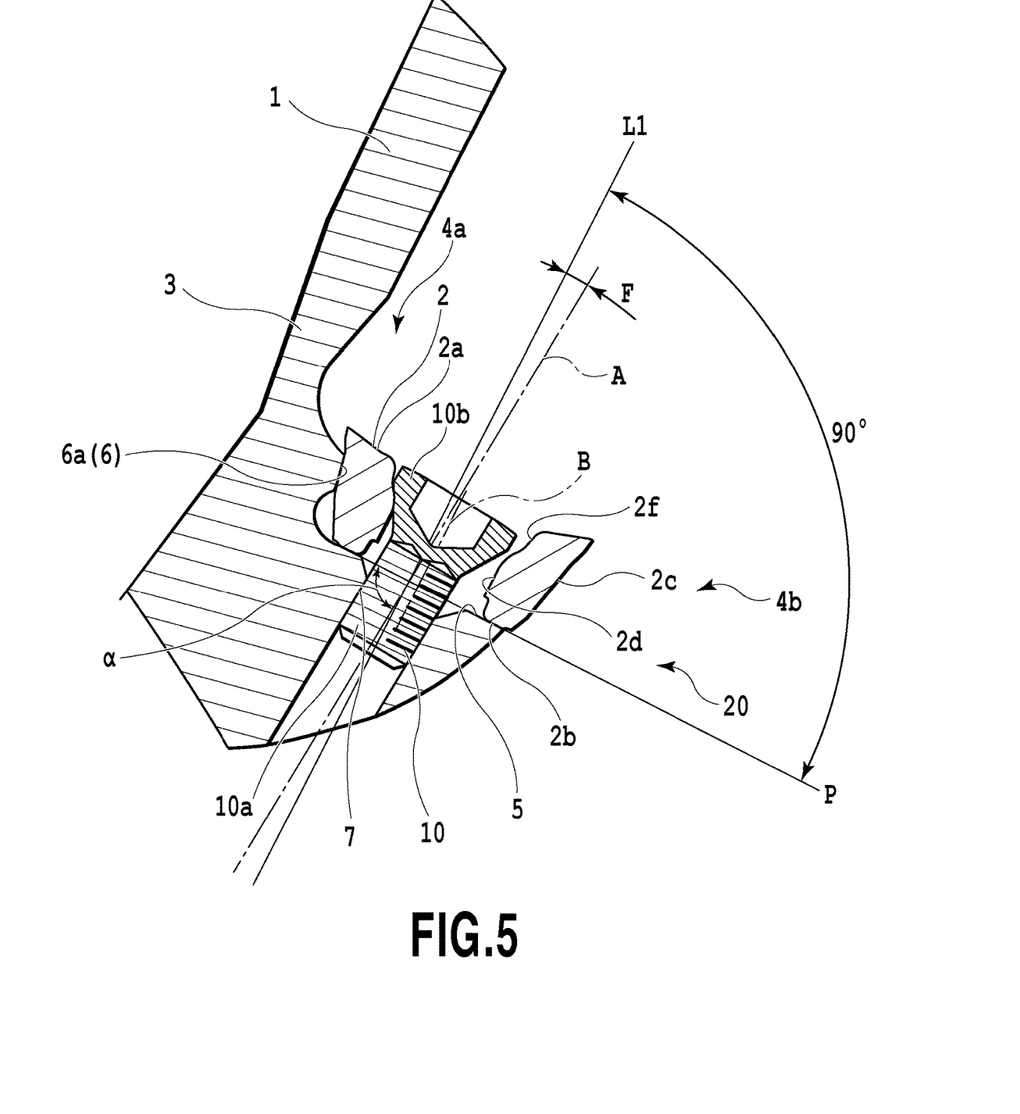
FIG. 5 is an enlarged sectional view of the cutting tool in FIG. 1 along a V-V line in FIG. 4.
Figure 6:
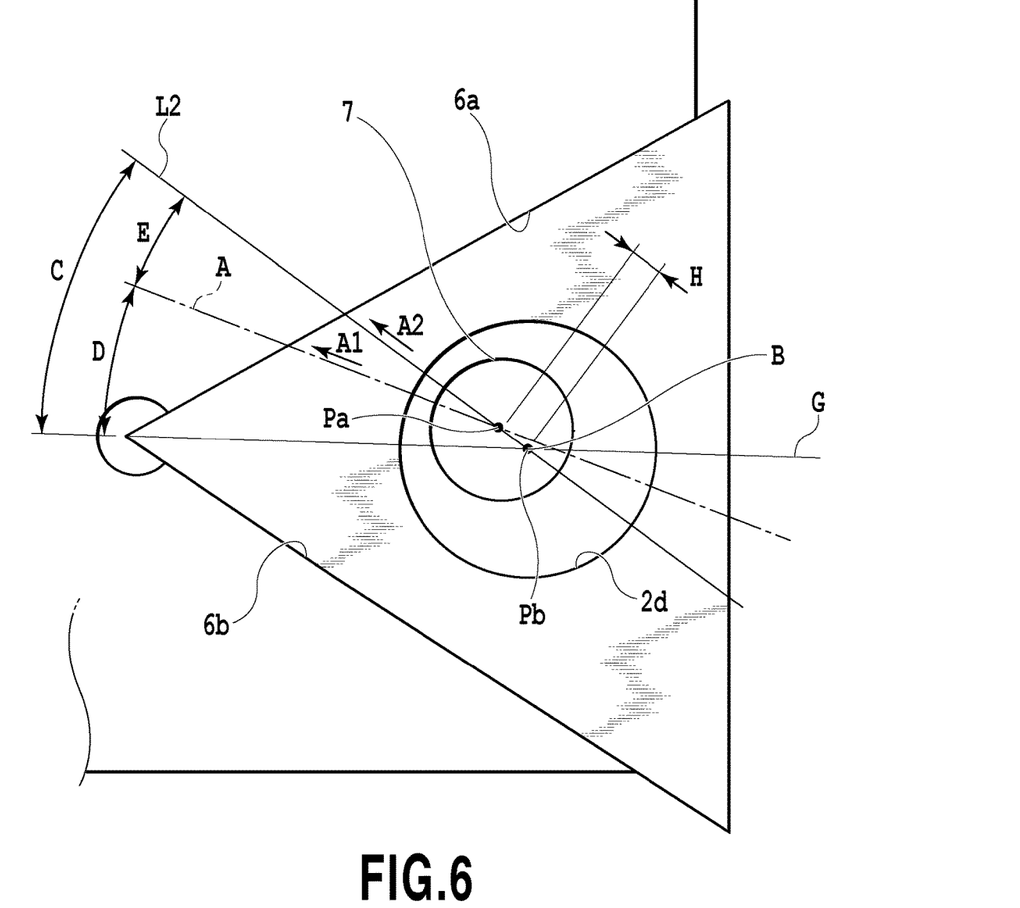
FIG. 6 is a schematic view illustrating a state in which the cutting insert is mounted on the insert mounting seat in the cutting tool in FIG. 1 in an exaggerated manner.

FIG. 1 is a perspective view of a cutting tool in the embodiment of the present invention. FIG. 2 is an enlarged perspective view of an insert mounting seat and its periphery of a tool body form which a cutting insert and a fixing screw are removed in the cutting tool in FIG. 1. FIG. 3 is an enlarged view when the insert mounting seat in FIG. 2 is seen from a direction opposite to a bottom wall surface. FIG. 4 is an enlarged view of a part of the cutting tool in FIG. 1 seen from the same direction as in FIG. 3. FIG. 5 is an enlarged sectional view of the cutting tool along a V-V line in FIG. 4. FIG. 6 is a schematic view illustrating a state in which the cutting insert is mounted on the insert mounting seat in an exaggerated manner and a view from which a screw is omitted.

As illustrated in FIGS. 1 to 5, the cutting tool 1 in this embodiment is a rotary cutting tool in which a cutting insert 2 is detachably mounted. The cutting tool 1 includes a tool body 3. The tool body 3 has an axis 3a, and the axis 3a extends from a leading end portion 3b side to a rear end portion 3c side of the tool body 3. The tool body 3 has a profile of substantially a columnar shape in general. The tool body 3 has a plurality of (three in this embodiment) insert mounting seats 4. These insert mounting seats 4 are arranged at an equal distance from each other in a circumferential direction around the axis 3a in the leading end portion 3b of the tool body 3. However, the number of insert mounting seats in the tool body may be any, such as one, two or more. On each of the insert mounting seats 4, the cutting insert 2 is detachably mounted. Therefore, in the cutting tool 1, a plurality of (three in this embodiment) cutting inserts 2 is used, and a plurality of tightening screws (fixing screws) 10 is used for fixing each of them.

Each of the cutting inserts 2 has a substantially triangular plate-shaped profile shape. Each of the cutting inserts 2 is a positive type cutting insert but may be a negative type cutting insert. The cutting insert 2 includes an upper surface 2a and a lower surface 2b as two end surfaces and a peripheral side surface 2c extending between the upper and lower surfaces. The cutting insert 2 has a through hole 2d corresponding to each of tightening screws 10 extending so as to penetrate the upper and lower surfaces. The through hole 2d has a central axis B and a receiving recess portion 2f in an upper surface side opening portion along its axis B.

The tightening screw 10 has an axis (not shown) extending in its longitudinal direction and is constituted by a screw portion 10a on which a thread is formed and a head portion 10b arranged on one end of the screw portion 10a in the axial direction. The head portion 10b is constituted so that a tightening tool such as a wrench can be engaged therewith, and a recess portion is formed here. The head portion 10b has a diameter larger than the screw portion 10a. Here, a portion on the screw portion 10a side on an outer peripheral portion of the head portion 10b has a frustoconical shape. However, the outer peripheral portion of the head portion 10b may have a projecting arc section so as to expand outward partially or generally. When the tightening screw 10 is inserted with its screw portion 10a as a leading end from one end (upper surface side) of the through hole 2*d* of the cutting insert 2, a receiving recess portion 2*f* in which the head portion 10*b* of the tightening screw 10 is substantially accommodated and on which the head portion 10*b* abuts is formed on an upper surface side opening portion of the through hole 2*d* as described above.

In the cutting insert 2, a cutting edge 2*g* is formed along an intersecting portion between the upper surface 2*a* and a peripheral side surface 2*c*. The cutting insert 2 has a plurality of (three, here) cutting edges 2*g* over the entire circumference of the intersecting portion between the upper surface 2*a* and the peripheral side surface 2*c*, but at least one cutting edge may be formed only on at least a part of the intersecting portion. The upper surface 2*a* has a substantially triangular shape and has three corner portions. Since the cutting edge 2*g* is associated with each of the corner portions, the cutting insert 2 has the three cutting edges 2*g*. Each of the cutting edges 2*g* includes a corner cutting edge 2*h* along the corner portion, a first cutting edge 2*i* extending from this corner cutting edge 2*h*, and a second cutting edge 2*j* extending toward a side opposite to the first cutting edge 2*i* from the corner cutting edge 2*h*. The three cutting edges 2*g* are arranged 120° rotation-symmetric with respect to the central axis B of the through hole 2*d*. In response to that, the cutting insert 2 is formed so as to be 120° rotation-symmetric to the central axis B of the through hole 2*d*. In the cutting insert 2, the three cutting edges 2*g* are continuous to each other but may be independent from each other. In the cutting insert 2 mounted in the cutting tool 1, a part of the upper surface 2*a* is constituted to function as a rake face of one operable cutting edge 2*g'*, and a part of the peripheral side surface 2*c* is constituted to function as a flank face of the operable cutting edge 2*g'*. In the cutting insert 2, various changes can be made, and for example an inclined surface or a recess portion including this inclined surface as a rake face for giving a positive rake angle to the upper surface 2*a* or a rising wall surface continuing to a boss surface provided if cutting edges are provided on both surfaces of the cutting insert may be provided. Moreover, the cutting edge may be inclined generally or partially, and a portion of the cutting edge may be linear or curved.

In the rotary cutting tool 1 of this embodiment, all of the plurality of cutting inserts 2 is made to have the same shape. This rotary cutting tool 1 has edges in the number corresponding to the number of the cutting inserts 2 in use. Therefore, for simplification of explanation, only one cutting insert 2 will be described below, but the same applies to all the other cutting inserts 2. Moreover, the plurality of tightening screws 10 and the insert mounting seats 4 also have the same shape. One tightening screw 10 and one insert mounting seat 4 will be described below, but the same applies to all the other tightening screws 10 and insert mounting seats 4.

Each of the insert mounting seats 4 has a bottom wall surface 5 and a side wall surface 6. A profile shape of the bottom wall surface 5 of the insert mounting seat 4 corresponds to a profile shape of the cutting insert 2. In this embodiment, a profile shape of the bottom wall surface 5 is substantially triangular. A screw hole 7 corresponding to the tightening screw 10 intersects the bottom wall surface 5 of the insert mounting seat 4. That is, the screw hole 7 is opened in the bottom wall surface 5. The tightening screw 10 can be screwed into the screw hole 7. The tightening screw 10 can be engaged with the screw hole 7 capable of advancing/retreating along a central axis A of the screw hole 7. That is, the tightening screw 10 can be tightened or loosened with respect to the screw hole 7. By tightening the tightening screw 10 into the screw hole 7 through the through hole 2*d* of the cutting insert 2, the cutting insert 2 is pressed and fixed to the bottom wall surface 5 and the side wall surface 6 of the insert mounting seat 4.

A mounting structure 20 for mounting the cutting insert 2 including the insert mounting seat 4 with the screw hole 7 is called a mounting device, here. Here, the tightening screw 10 is assumed to be a constituent element of the mounting device 20. However, since the tightening screw 10 is an independent structural body, the mounting structure excluding the tightening screw may be made the mounting device.

The insert mounting seat 4 of the tool body 3 in this embodiment has two side wall surfaces (side wall surface portions) 6, each being a wall surface extending so as to intersect the bottom wall surface 5. One of them is a first side wall surface 6*a* which becomes a main constraining surface. The other is a second side wall surface 6*b* which becomes a sub constraining surface. The main constraining surface is a side wall surface (surface portion) mainly acting on the side wall surfaces 6 in contact with the cutting insert 2. The sub constraining surface is a side wall surface (surface portion) other than the main constraining surface in the side wall surfaces 6 in contact with the cutting insert 2. The main constraining surface is preferably formed larger than the sub constraining surface. Conversely, the side wall surface having the largest area in contact with the cutting insert 2 in the plurality of side wall surfaces in contact with the cutting insert 2 can be called the main constraining surface. In this embodiment, the profile shape of the cutting insert 2 is a substantially triangular plate shape and thus, in the insert mounting seat 4, the first side wall surface 6*a* is arranged on the base end portion 3*c* side of the tool body, and the second side wall surface 6*b* is arranged on the leading end portion 3*b* side of the tool body. The first side wall surface 6*a* has a lateral width (width along the bottom wall surface) larger than that of the second side wall surface 6*b* and mainly acts when the cutting insert 2 is fixed. The second side wall surface 6*b* assists the first side wall surface 6*a* to support and constrain the cutting insert 2. That is, in the insert mounting seat 4, the first side wall surface 6*a* is the main constraining surface and the second side wall surface 6*b* is the sub constraining surface. The cutting insert 2 has its movement in its rotating direction constrained by abutting on the first side wall surface 6*a* which is the main constraining surface and preferably has its position specifically defined by being in contact with the second side wall surface 6*b* which is the sub constraining surface.

In the insert mounting seat 4, the bottom wall surface 5, the first side wall surface 6*a*, and the second side wall surface 6*b* are substantially constituted as planes, respectively. However, these wall surfaces may be provided with projections and depressions or the like corresponding to the cutting insert. In the first side wall surface 6*a*, a recess portion 6*c* is provided in the middle of the direction along the bottom wall surface 5. This recess portion 6*c* divides the first side wall surface 6*a* into two wall surface portions but does not have to be provided.

Here, further explanation will be made by using FIGS. 3 to 5. FIGS. 3 and 4 are views from a direction opposite to the bottom wall surface 5 of the insert mounting seat 4, and in FIGS. 3 and 4, the bottom wall surface 5 is substantially parallel with a paper plane. In FIGS. 3 and 4, the central axis A of the screw hole 7 in the bottom wall surface 5 is projected and indicated as a virtual line. FIG. 5 is a sectional view of the cutting tool 1 on a plane including the central axis A of the screw hole 7. FIG. 4 illustrates a state in which the cutting insert 2 is mounted on the insert mounting seat 4 of FIG. 3 when seen from a position exactly opposite to the bottom wall surface 5 of the insert mounting seat 4 and thus, FIG. 5 is a view on a section orthogonal to the bottom wall surface 5. In FIG. 5, a line L1 extending so as to be orthogonal to the bottom wall surface 5 of the insert mounting seat 4 is depicted, and this line L1 intersects the central axis A of the screw hole 7 on a first virtual plane P defined so as to extend (expand) the bottom wall surface 5.

As illustrated in FIG. 5, the central axis A of the screw hole 7 is inclined with respect to the normal direction (that is, the line L1) of the bottom wall surface 5 of the insert mounting seat 4. Inclination of the central axis A of the screw hole 7 in FIG. 5 with respect to the line L1 along the normal direction of the bottom wall surface 5 (hereinafter referred to as a normal-direction inclination) is indicated by an inclination angle F defined in FIG. 5. In this embodiment, the inclination angle F (that is, an angle formed by the line L1 and the central axis A in FIG. 5) is approximately 5°.

In FIG. 5, the central axis A of the screw hole 7 is inclined toward the outside of the cutting tool 1 on an upper side of the insert mounting seat 4 with reference to the line L1. Therefore, when the tightening screw 10 is screwed into the screw hole 7, the screw 10 advances in an inside direction of the tool body 3. The insert mounting seat 4 has a seat inner-side portion 4a on the side of the two side wall surfaces 6a and 6b and a seat outer-side portion 4b opened outward in the tool body 3, unlike the seat inner-side portion and thus, in other words, the farther the central axis A of the screw hole 7 is spaced away from the bottom wall surface 5 to a hole depth side, the closer the central axis A is inclined to the seat inner-side portion 4a than the seat outer-side portion 4b. As described above, in the cutting tool 1, the central axis A of the screw hole 7 is inclined so as to form an insert internal acute angle α with the portion of the bottom wall surface on the side wall surface 6 side in the sectional view in FIG. 5 (second virtual plane).

Therefore, the central axis A of the screw hole 7 depicted as a virtual line in FIGS. 3 and 4 extends in a predetermined direction. Here, when the central axis A is projected on the first virtual plane P, it is indicated as shown in FIG. 3. A direction (hereinafter referred to as an inclination direction) of the central axis A of the screw hole 7 on the first virtual plane P (which is a surface substantially parallel with the bottom wall surface 5) is defined, in a restricted sense, to be a direction from a passage point Pa of the axis A of the screw hole 7 to the side wall surface 6 side on the first virtual plane (see an arrow A1 in FIG. 6). As illustrated in FIG. 3, the inclination direction of the central axis A of the screw hole 7 in FIG. 3 can be defined with respect to a reference line (reference surface) G.

Here, a corner intersecting portion 4c between the first side wall surface 6a and the second side wall surface 6b can be approximated as the intersecting portion 6d (see FIG. 3) defined by an extension surface of the first side wall surface 6a and an extension surface of the second side wall surface 6b. Since the cutting insert 2 has a substantially triangular plate shape, it mainly has three side surfaces, and an intersecting angle of this intersecting portion 6d corresponds to an insert internal angle between the adjacent two side surfaces of the cutting insert 2 and is an acute angle. In the corner intersecting portion 4c (that is, the intersecting porting 6d), the reference surface (third virtual plane) extending between the first side wall surface 6a and the second side wall surface 6b and substantially orthogonal to the bottom wall surface 5 is defined so as to bisect the intersecting angle of this corner intersecting portion. This reference surface is indicated as a line G in FIG. 3. Therefore, in FIG. 3, the reference line G, when a line along the first side wall surface 6a and a line along the second side wall surface 6b are extended and intersected, respectively, extends in a direction of bisector of the intersecting angle of the intersecting portion of the two extension lines. As obvious from FIG. 3, the projected central axis A of the screw hole 7 is not parallel with but inclined relative to the reference line G. The inclination of the central axis A of the screw hole 7 with respect to the reference line G in FIG. 3 is indicated by an angle D defined in FIG. 3. However, the angle D is defined on the seat inner-side portion 4a side with respect to the intersecting portion between the central axis A and the reference line G. A sign of the angle D is determined with the direction from the second side wall surface 6b side to the first side wall surface 6a side as positive, here.

If the angle D of the central axis A in the inclination direction is approximately 0°, for example, by screwing the tightening screw 10 into the screw hole 7 of the insert mounting seat 4 through the through hole 2d of the cutting insert 2, the tightening force to the tightening screw 10 can be distributed to the first side wall surface 6a and the second side wall surface 6b substantially uniformly. On the other hand, if the angle D is a positive angle as in the mounting device 20 of the cutting tool 1, the cutting insert 2 can be mainly constrained by the first side wall surface 6a in its circumferential direction. In this embodiment, the angle D of the central axis A in the inclination direction is set to be approximately 30°. By forming the screw hole 7 so that the central axis A of the screw hole 7 is inclined with the normal-direction inclination angle F and the inclination-direction inclination angle D, when the cutting insert 2 is placed on the insert mounting seat 4 and the tightening screw 10 is tightened, the cutting insert 2 is pressed toward the side wall surface 6 of the insert mounting seat 4 ahead in the inclination direction.

The angle F of the normal-direction inclination is preferably within a range from not less than 1° to not more than 10°. The angle F is more preferably within a range from not less than 3° to not more than 6°. On the other hand, the angle D of the central axis A in the inclination direction is preferably within a range from not less than 1° to not more than 50°. The angle D of the central axis A in the inclination direction is more preferably within a range from not less than 20° to not more than 40°. By setting the angle F of the normal-direction inclination and the angle D in the inclination direction within these angular ranges, the effect of increasing the tightening force can be obtained to the maximum while drastically reducing action thereof so as to fracture the tightening screw 10. Thus, fixation of the cutting insert 2 is made more stable, and generation of a gap between the cutting insert 2 and the insert mounting seat 4 can be reliably prevented. Alternatively, movement of the cutting insert 2 during cutting can be prevented more reliably. If the angle F of the normal-direction inclination exceeds 10°, the through hole 2d of the cutting insert 2 and the tightening screw 10 are biased and interfere with each other easily, which is not preferable. If the angle D of the central axis A in the inclination direction exceeds 50°, a contact state between the cutting insert 2 and the second side wall surface 6b is likely to be insufficient, which is not preferable. The angle F and the angle D are preferably determined so as to suitably support the cutting insert 2 with the first side wall surface 6a as the main constraining surface and the second side wall surface 6b as the sub constraining surface in the circumferential direction (direction around the axis B of the through hole 2d) of the cutting insert 2, respectively.

Moreover, as obvious from FIGS. 5 and 6, the central axis A of the screw hole 7 is formed shifted only by an axis shift amount H to an inside (that is, the side wall surface side) of the insert mounting seat 4 from the central axis B of the through hole in the cutting insert 2. However, in the sectional view of FIG. 5 in which the central axis A of the screw hole 7 fully extends, the central axis B of the through hole 2d of the cutting insert 2 does not appear actually. However, in order to depict the shift between the two central axes A and B, the central axis B of the through hole 2d depicted in FIG. 6 is projected and indicated for reference in FIG. 5. If being illustrated in actual scale, a state in which the two central axes A and B are shifted from each other cannot be recognized easily. Thus, FIG. 6 is a schematic diagram illustrating the state in which they are shifted from each other in an exaggerated manner, and further explanation will be continuously made by using FIG. 6. However, similarly to FIGS. 3 and 4, FIG. 6 is a view from the direction opposite to the bottom wall surface 5 of the insert mounting seat 4, and the bottom wall surface 5 is substantially parallel with the paper plane in FIG. 6. Therefore, in FIG. 6, the central axis B of the through hole 2d of the cutting insert 2 illustrated there is substantially a point.

As described above, since the central axis A of the screw hole 7 is inclined with respect to the bottom wall surface 5, the central axis A of the screw hole 7 and the central axis B of the through hole 2d of the cutting insert 2 on the insert mounting seat 4 are not parallel with each other. Moreover, the central axis A of the screw hole 7 is shifted to the inside of the insert mounting seat (seat inner-side portion 4a side) with respect to the central axis B of the through hole 2d of the cutting insert 2. This shift amount is expressed by the axis shift amount H, here. The axis shift amount H is defined to be a shift amount between the central axes A and B on the first virtual plane P along the bottom wall surface 5 of the insert mounting seat 4. In FIG. 6, the passage point Pa of the central axis A of the screw hole 7 on the first virtual plane P and a passage point Pb of the central axis B of the through hole 2d of the cutting insert 2 on the first virtual plane P are illustrated. However, the position of the through hole 2d in this case is a position in the cutting insert 2 placed so as to be in reliable contact with the wall surfaces 5 and 6 of the insert mounting seat 4. This first virtual plane P is an extension surface of the bottom wall surface 5 defined so as to extend the bottom wall surface 5 to the inside of the through hole. Moreover, on the first virtual plane P, a direction in which the passage point Pa of the central axis A of the screw hole 7 is shifted from the passage point Pb of the central axis B of the through hole 2d is defined to be the axis shift direction. The axis shift direction is a direction along a line L2 in FIG. 6 (see an arrow A2).

In this embodiment, the axis shift amount H of the central axis A of the screw hole 7 is set to be approximately 0.5 mm. However, this is not limiting. In this embodiment, the axis shift amount H is set as large as approximately 0.5 mm, but by means of the above-described synergic effect with the inclination of the central axis A of the screw hole 7, the effect of making the fixation of the cutting insert 2 more stable without fracturing the screw 10 can be obtained.

The axis shift direction can be evaluated by an angle C between the line L2 passing through the point Pa and the point Pb in FIG. 6 and the reference line G. FIG. 6 also illustrates the reference line G indicated in FIG. 3. The angle C in the axis shift direction is determined similarly to the above-described angle D, and its sign is determined with a direction from the second side wall surface 6b side toward the first side wall surface 6a side as positive.

When the angle C in the axis shift direction is approximately 0°, the tightening force to the tightening screw can be distributed to the first side wall surface 6a and the second side wall surface 6b substantially uniformly. On the other hand, when the angle C in the axis shift direction is a positive angle, the cutting insert 2 is actively pressed onto the first side wall surface 6a by tightening the tightening screw, and as a result, it can be mainly constrained by the first side wall surface 6a. By placing the cutting insert 2 on the insert mounting seat 4 and then tightening the tightening screw 10, the cutting insert 2 is shifted toward at least one predetermined side wall surface 6 of the insert mounting seat 4 in the axis shift direction. However, to be strict, an influence of a friction force caused by rotation of the tightening screw 10 cannot be ignored as a factor for controlling the tightening force of the cutting insert 2. Therefore, the angle C in the axis shift direction that can distribute the tightening force to the first side wall surface 6a and the second side wall surface 6b substantially uniformly is not 0°, strictly speaking. In other words, if the angle C in the axis shift direction is approximately 0° and the right-screwed tightening screw 10 is to be used, for example, the first side wall surface 6a constrains the cutting insert 2 more strongly than the second side wall surface 6b. That is, by means of the synergic effect of the axis shift direction and the rotating direction of the tightening screw 10, a strong tightening force with the first side wall surface 6a as the main constraining surface can be obtained. The present invention has a great feature in which the axis shift direction and the inclination direction of the screw are different directions. That is, by adjusting the axis shift direction and the direction of the projection inclination of the screw hole axis as independent parameters, respectively, firm fixation of the cutting insert 2 which was not obtained with the prior art can be realized.

In this embodiment, the axis shift direction is set to be a direction toward the first side wall surface 6a. This is obvious from the fact that the line L2 intersects the first side wall surface 6a in FIG. 6. In FIG. 6 of the insert mounting seat 4 seen from the direction opposite to the bottom wall surface 5, the angle C in the axis shift direction is preferably within a range from not less than 20° to not more than 90°. The angle C in the axis shift direction is more preferably within a range from not less than 30° to not more than 50°. If the angle C in the axis shift direction is less than 20°, a marked improvement effect of the tightening force is difficult to be obtained as compared with the prior-art cutting tool. If the angle C in the axis shift direction exceeds 90°, the tightening force to the screw acts on a direction of separating the cutting insert 2 from the second side wall surface 6b, which is not preferable. The angle C in the axis shift direction in the cutting tool 1 in this embodiment is set to be approximately 35°. By setting the axis shift direction to such a direction, when the tightening screw is tightened to the insert mounting seat 4 through the through hole 2d of the cutting insert 2, the cutting insert 2 is firmly pressed onto the first side wall surface 6a and can be brought into close contact therewith. As described above, in the cutting tool of this embodiment, the tightening screw is threadedly engaged with the bottom wall surface with inclination, and the inclination direction is directed toward the first side wall surface 6a side. If the screw is inclined as such, an actual contact spot between the cutting insert 2 and the tightening screw 10, that is, the actual axis shift direction moves closer to the first side wall surface 6a side than the angle C in the axis shift direction. Therefore, by means of the further synergic effect of the axis shift direction and the screw inclination direction, the first side wall surface 6a can be made to act on support of the cutting insert 2 further mainly.

Subsequently, an angular difference E between the inclination direction of the screw and the axis shift direction will be described. The present invention has a great feature in which the axis shift direction (arrow A2 in FIG. 6) and the inclination direction (arrow A1 in FIG. 6) are made different directions (the line L2 and the line A are not in parallel in FIG. 6). A sign of the angular difference E is positive in a direction toward the second side wall surface 6b with reference to the axis shift direction, that is, the line L2. However, if the sign of the angular difference E does not matter, the angular difference E may be simply an angle formed by the inclination direction of the screw and the axis shift direction. In order to make fixation of the cutting insert 2 more stable, the inclination direction is preferably made a direction toward the second side wall surface 6b side (that is, a direction closer to the second side wall surface 6b) as compared with the axis shift direction. The angular difference E is preferably within a range from not less than 1° to not more than 80°. The angular difference E is more preferably within a range from not less than 3° to not more than 10°. In this embodiment, the angular difference E is set to be approximately 5°. If the angular difference E exceeds 80°, or particularly exceeds 90°, either one of movement of the cutting insert by the inclination of the screw and movement of the cutting insert by the axis shift acts on a direction of separating the cutting insert 2 from the second side wall surface 6b, which is not preferable.

If the inclination direction of the screw and the axis shift direction are set to the respective directions and angles (C, D, and E) as described above, fixation of the cutting insert 2 can be made more stable. That is because, when the tightening screw 10 is tightened, the cutting insert 2 is first brought close to the axis shift direction and brought into close contact with the first side wall surface 6a which is the main constraining surface. By further tightening the tightening screw 10, the cutting insert 2 is moved in parallel to the second side wall surface 6b side so as to be in more reliable contact with the second side wall surface 6b while in close contact with the first side wall surface 6a. Therefore, the cutting insert 2 is also brought into contact with the second side wall surface 6b while in close contact with the first side wall surface 6a and therefore is firmly fixed. That is, by associating the axis shift direction and the inclination direction as above, the two side wall surfaces 6 of the insert mounting seat 4 can exert the intended function and action that the first side wall surface 6a is made the main constraining surface and the second side wall surface 6b is made the sub constraining surface. Therefore, according to this embodiment, an attitude of the cutting edge is mainly determined by the first side wall surface 6a which is the main constraining surface, and reproducibility of the cutting edge position is high, and highly accurate cutting work can be handled. Moreover, damage on the cutting insert can be suppressed.

In the case of the prior-art cutting tool in which the cutting insert is shifted only by the inclination of the screw or only by the axis shift or in the case in which the inclination direction and the axis shift direction are made the same direction, it is difficult to maintain one side surface (side surface along one side portion of the upper surface 2a) of the peripheral side surface of the cutting insert 2 reliably in contact with the first side wall surface 6a while bringing another side surface (side surface along another side portion of the upper surface 2a) of the cutting insert 2 into reliable contact with the second side wall surface 6b. That is because, if the inclination direction and the axis shift direction are the same direction, the cutting insert 2 is pressed in the direction to be in contact with both the two side wall surfaces 6 and thus, it is difficult to control with which of the side wall surfaces 6 the cutting insert is to be in close contact, and variation can easily occur in the close contact state between the cutting insert and the side wall surface. Therefore, the cutting insert may closely contact with the second side wall surface 6b which is the sub constraining surface, and may contact with the first side wall surface 6a with inclination, which might result in unstable fixation. That is because contact between the cutting insert 2 and the insert mounting seat 4 which are two objects enters a state close to so-called three-point support in principle except an ideal state ignoring manufacturing errors. Therefore, if the cutting insert is to be supported by using the two side wall surfaces, the cutting insert contacts one of the side wall surfaces at two spots but can contact the other side wall surface only at one spot. That is, if the cutting insert is made to closely contact one side wall surface, it cannot be made to closely contact the other side wall surface in principle. As a result, stochastic variation can occur in which of the side wall surfaces the cutting insert is to closely contact unless such a structure is employed that it closely contacts one of side wall surfaces preferentially. In this embodiment of the present invention, by making the axis shift direction and the inclination direction different as above, the axis shift direction is made a direction mainly directed toward the first side wall surface 6a, while the inclination direction is made a direction directed toward the both side wall surfaces 6a and 6b as compared with the axis shift direction. Therefore, the cutting insert 2 is reliably pressed onto the first side wall surface 6a and can be also brought into reliable contact with the second side wall surface 6b, whereby the cutting insert 2 is firmly fixed.

In this embodiment, as illustrated in FIG. 5, the tightening screw 10 can have a gap partially between the tightening screw 10 and the through hole 2d of the cutting insert when being firmly tightened. However, when the tightening screw 10 is tightened, the head portion 10b of the tightening screw 10 is preferably in contact with the surface defining the through hole 2d of the cutting insert 2 on substantially the entire circumference with respect to the periphery of the central axis B of the through hole 2d. For example, by forming the outer peripheral portion of the head portion 10b of the tightening screw 10 into a projecting arc section shape so as to expand outward as described above, this entire circumferential contact can be achieved. Alternatively or additionally, the receiving recess portion 2f of the cutting insert is preferably further shaped so as to achieve such entire circumferential contact. By constituting as such, an effect of preventing fracture of the tightening screw 10 in tightening is maximized. Since the inclination direction and the axis shift direction are different as described above, even if the tightening screw 10 is in contact with the through hole defining surface of the cutting insert 2 on substantially the entire circumference, the cutting insert 2 can be brought into contact with the second side wall surface 6b while abutting on the first side wall surface 6a reliably.

As described above, the cutting insert 2 of this embodiment is assumed to have a substantially triangular plate shape. However, the present invention is not limited to that. The cutting insert of the present invention can employ various polygonal plate shapes, a circular plate shape and the like as long as a through hole corresponding to the tightening screw is provided. For example, the present invention can be also applied to a cutting tool using a hexagonal plate-shaped cutting insert. The plate shape is not limiting, either, and is capable of various applications. However, the present invention is particularly effective if the side wall surface 6 of the insert mounting seat 4 has the main constraining surface (or equivalent portion) and the sub constraining surface (or equivalent portion). That is, the present invention is particularly effective if the first side wall surface 6a which is the main constraining surface is made to mainly function. If the substantially triangular plate-shaped cutting insert 2 is used as in this embodiment, the side wall surface 6 of the insert mounting seat 4 is constituted mainly by two wall surface portions, and the lengths of the two wall surfaces are different. Therefore, the side wall surface 6 of the insert mounting seat 4 has the first side wall surface 6a and the second side wall surface 6b. Moreover, in the substantially triangular plate-shaped cutting insert 2, since the length of the cutting edge (that is, the first cutting edge 2i substantially extending in the tool axial direction) can be taken long as illustrated in FIGS. 1 and 4, cutting work with a large cut can be made. In the cutting work with a large cut, the cutting insert 2 can easily move during cutting. Therefore, the present invention is particularly effective in the cutting tool 1 using the substantially triangular plate-shaped cutting insert 2.

A material of the cutting insert 2 may be preferably a cemented carbide, cermet, ceramics, and cubic boron nitride or a material applying coating on the surfaces of those hard materials or a sintered body material such as a diamond at least for the cutting edge or its vicinity.

The above-described cutting tool 1 can be used for cutting work of a steel material o the like by being mounted on a machine tool. The present invention is not limited to the above-described embodiment but can be applied to a turning tool for a lathe, various rotary cutting tools used in a milling machine and the like. The present invention can be applied to various tools, and there is substantially no restriction on applied cutting tools. Only the rotary cutting tool is described in the embodiment, but the present invention can be applied to various tools for lathe.

The present invention is not limited to the above-described embodiment and its variations. It should be understood that the present invention is capable of various alterations or changes without departing from the spirit or scope of the invention described in claims. That is, the present invention includes any variations, applications, and equivalents included in the idea of the present invention specified by the claims.

The invention claimed is:

1. A cutting insert mounting system adapted for a cutting tool in which, by screwing a tightening screw into a threaded screw hole of an insert mounting seat of a tool body through a through hole of a cutting insert, the cutting insert is detachably mounted on the insert mounting seat, wherein
    the insert mounting seat has a bottom wall surface and at least two side wall surfaces extending so as to intersect the bottom wall surface;
    the threaded screw hole intersects the bottom wall surface of the mounting seat;
    the tightening screw has a screw portion on which a thread is formed, the thread configured to be received into and threadingly engage, said threaded screw hole;
    a central axis of the screw hole is inclined with respect to a normal direction of the bottom wall surface;
    when the cutting insert is placed on the insert mounting seat, on a first virtual plane defined so as to expand the bottom wall surface, a first passage point of the central axis of the screw hole is shifted to at least either one side of the at least two side wall surfaces from a second passage point of a central axis of the through hole; and
    when a shift direction of the first passage point of the central axis of the screw hole from the second passage point of the central axis of the through hole on the first virtual plane is defined as an axis shift direction, and a direction of a virtual line obtained by projecting the central axis of the screw hole onto the first virtual plane is defined as an inclination direction,
    the axis shift direction and the inclination direction are different directions.

2. The cutting insert mounting system according to claim 1, wherein
    the central axis of the screw hole lies on a second virtual plane which is orthogonal to the bottom wall surface, and
    the central axis of the screw hole forms an insert internal acute angle with a portion of the bottom wall surface which lies on the first virtual plane, on a side of the at least two side wall surfaces.

3. The cutting insert mounting system according to claim 1, wherein
    the inclination direction of the central axis of the screw hole on the first virtual plane is a direction from the first passage point to the side of the at least two side wall surfaces;
    the at least two side wall surfaces include a first side wall surface as a main constraining surface and a second side wall surface as a sub constraining surface; and
    the axis shift direction is directed to a side of the first side wall surface of the first and second side wall surfaces and the inclination direction is closer to a side of the second side wall surface of the first and second side wall surfaces as compared with the axis shift direction.

4. The cutting insert mounting system according to claim 1, wherein
    the inclination direction of the central axis of the screw hole on the first virtual plane is a direction from the first passage point to the side of the at least two side wall surfaces;
    the at least two side wall surfaces include a first side wall surface as a main constraining surface and a second side wall surface as a sub constraining surface;
    at an intersecting portion defined by an extension of each of the first side wall surface and the second side wall surface, when a third virtual plane extending so as to be substantially orthogonal to the bottom wall surface is defined between the first side wall surface and the second side wall surface so as to bisect an intersecting angle at the intersecting portion,
    the inclination direction and the axis shift direction are directed to a region on the first side wall surface side in the two regions bounded by the third virtual plane.

5. The cutting insert mounting system according to claim 3, wherein
    the inclination direction and the axis shift direction are both directed so as to intersect the first side wall surface.

6. The cutting insert mounting system according to claim 3, wherein
    at an intersecting portion defined by an extension of each of the first side wall surface and the second side wall surface, when a third virtual plane extending so as to be substantially orthogonal to the bottom wall surface is defined between the first side wall surface and the second side wall surface so as to bisect an intersecting angle at the intersecting portion, on the first virtual plane, an angle of the axis shift direction to the third virtual plane is within a range from not less than 20° to not more than 90°.

7. The cutting insert mounting system according to claim 3, wherein
on the first virtual plane, an angular difference between the inclination direction and the axis shift direction is within a range from not less than 1° to not more than 80°.

8. The cutting insert mounting system according to claim 3, wherein
an intersecting angle of an intersecting portion defined by the extension of each of the first side wall surface and the second side wall surface is an acute angle.

9. The cutting insert mounting system according to claim 1, wherein:
an outer peripheral portion of a head portion of the tightening screw has a projecting arc section shape; and
when the tightening screw is screwed into the threaded screw hole through the through hole of the cutting insert, the tightening screw is in contact with a surface defining the through hole.

10. A tool body comprising the cutting insert mounting system according to claim 1.

11. A cutting tool comprising the cutting insert mounting system according to claim 1.

12. In combination, a tool body having an insert mounting seat and a cutting insert having a through hole provided with an insert central axis (B), wherein the insert mounting seat comprises:
a bottom wall surface defining a first virtual plane (P);
first and second side wall surfaces extending so as to intersect the bottom wall surface, imaginary extensions of the first and second side walls converging to define a vertex at an intersecting portion, as viewed in a direction opposite the bottom wall surface;
a threaded screw hole intersecting the bottom wall surface of the insert mounting seat, the screw hole having a screw hole central axis (A) which intersects the first virtual plane (P) at first passage point (Pa), the screw hole central axis (A) being inclined at a first inclination angle (F) with respect to a normal line (L1) to the first virtual plane (P), the normal line (L1) intersecting the screw hole central axis (A) at the first passage point (Pa);
a second passage point (Pb) being defined by the intersection of the insert central axis (B) with the first virtual plane (P), when the cutting insert is placed on the insert mounting seat and abuts the first and second side walls;
an inclination direction (A1) being defined by a virtual line obtained by projecting the screw hole central axis (A) onto the first virtual plane (P), as viewed in said direction opposite the bottom wall surface;
an axis shift direction (A2) being defined by an imaginary line (L2) extending between the second passage point (Pb) and the first passage point (Pa), as viewed in said direction opposite the bottom wall surface; and
wherein:
the inclination direction (A1) and the axis shift direction (A2) are different directions with a first angular difference (E) therebetween, as viewed in said direction opposite the bottom wall surface.

13. The combination according to claim 12, wherein:
the first angular difference (E) is within a range from not less than 3° to not more than 10°;
the first inclination angle (F) is within a range from not less than 3° to not more than 6°;
an imaginary reference line (G) bisects the vertex, as viewed in said direction opposite the bottom wall surface, and forms a second inclination angle (D) with the inclination direction (A1); and
the second inclination angle (D) is within a range from not less than 20° to not more than 40°.

* * * * *